(12) United States Patent
Koishida et al.

(10) Patent No.: US 11,244,696 B2
(45) Date of Patent: Feb. 8, 2022

(54) AUDIO-VISUAL SPEECH ENHANCEMENT

(71) Applicant: Microsoft Technology Licensing, LLC, Redmond, WA (US)

(72) Inventors: Kazuhito Koishida, Redmond, WA (US); Michael Iuzzolino, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 80 days.

(21) Appl. No.: 16/783,021

(22) Filed: Feb. 5, 2020

(65) Prior Publication Data

US 2021/0134312 A1 May 6, 2021

Related U.S. Application Data

(60) Provisional application No. 62/931,499, filed on Nov. 6, 2019.

(51) Int. Cl.
*G10L 21/0364* (2013.01)
*G06K 9/00* (2006.01)
(Continued)

(52) U.S. Cl.
CPC ...... *G10L 21/0364* (2013.01); *G06K 9/00281* (2013.01); *G06K 9/00744* (2013.01);
(Continued)

(58) Field of Classification Search
CPC .. G06K 9/00281; G06K 9/00744; G06K 9/00; G06K 9/00335; G06K 9/6271;
(Continued)

(56) References Cited

U.S. PATENT DOCUMENTS 7,269,560 B2  9/2007  Hershey et al.
7,587,318 B2  9/2009  Seshadri
(Continued)

OTHER PUBLICATIONS

D. Michelsanti, Z. Tan, S. Sigurdsson and J. Jensen ("On Training Targets and Objective Functions for Deep-learning-based Audio-visual Speech Enhancement," ICASSP 2019—2019 IEEE International Conference on Acoustics, Speech and Signal Processing (ICASSP), 2019, pp. 8077-8081), (Year: 2019).*
(Continued)

*Primary Examiner* — Angela A Armstrong
(74) *Attorney, Agent, or Firm* — Alleman Hall Creasman & Tuttle LLP

(57) ABSTRACT

Example speech enhancement systems include a spatio-temporal residual network configured to receive video data containing a target speaker and extract visual features from the video data, an autoencoder configured to receive input of an audio spectrogram and extract audio features from the audio spectrogram, and a squeeze-excitation fusion block configured to receive input of visual features from a layer of the spatio-temporal residual network and input of audio features from a layer of the autoencoder, and to provide an output to the decoder of the autoencoder. The decoder is configured to output a mask configured based upon the fusion of audio features and visual features by the squeeze-excitation fusion block, and the instructions are executable to apply the mask to the audio spectrogram to generate an enhanced magnitude spectrogram, and to reconstruct an enhanced waveform from the enhanced magnitude spectrogram.

20 Claims, 6 Drawing Sheets

(51) Int. Cl.
G10L 15/22 (2006.01)
G10L 15/25 (2013.01)
G10L 25/18 (2013.01)

(52) U.S. Cl.
CPC .............. *G10L 15/22* (2013.01); *G10L 15/25* (2013.01); *G10L 25/18* (2013.01)

(58) Field of Classification Search
CPC ......... G06K 9/629; G10L 15/22; G10L 15/25; G10L 25/18; G10L 2021/02087; G10L 21/0208; G10L 21/0272; G10L 21/0364; G10L 25/30; G06N 3/0445; G06N 3/0454; G06N 3/0481; G06N 3/08
See application file for complete search history.

(56) References Cited

U.S. PATENT DOCUMENTS

| | | | |
|---|---|---|---|
| 8,442,820 | B2 | 5/2013 | Kim et al. |
| 10,931,976 | B1* | 2/2021 | Joze .................... G10L 19/0204 |
| 2002/0116197 | A1 | 8/2002 | Erten |
| 2019/0005976 | A1* | 1/2019 | Peleg ................. G06K 9/00228 |
| 2019/0354797 | A1* | 11/2019 | Nesta ................... G06K 9/6293 |

OTHER PUBLICATIONS

Wu ("Deep convolutional neural network based on densely connected squeeze-and-excitation blocks", (Jun. 2019) AIP Advances, vol. 9, Issue 6, 065016, pp. 1-7). (Year: 2019).*

"Perceptual evaluation of speech quality (PESO): An objective method for end-to-end speech quality assessment of narrow-band telephone networks and speech codecs", In ITU-T Recommendation p. 862, Feb. 23, 2001, 30 Pages.

Afouras, et al., "My Lips are Concealed: Audio-Visual Speech Enhancement Through Obstructions", In Journal of Computing Research Repository, Jul. 11, 2019, 5 Pages.

Afouras, et al., "The Conversation: Deep Audio-Visual Speech Enhancement", In Repository of arXiv:1804.04121v1, Apr. 11, 2018, 5 Pages.

Barker, et al., "The PASCAL CHiME Speech Separation and Recognition Challenge", In Journal of Computer Speech & Language vol. 27, Issue 3, May 2013, 22 Pages.

Barker, et al., "The Third 'CHIME' Speech Separation and Recognition Challenge: Analysis and Outcomes", In Journal of Computer Speech and Language vol. 46, Nov. 2017, 33 Pages.

Bulat, et al., "How Far are We from Solving the 2D & 3D Face Alignment Problem? (and a Dataset of 230,000 3D Facial Landmarks)", In Proceedings of the IEEE International Conference on Computer Vision, Oct. 22, 2017, pp. 1021-1030.

Chen, et al., "Lip Movements Generation at a Glance", In Proceedings of the European Conference on Computer Vision, Sep. 8, 2018, 16 Pages.

Cherry, E Colin., et al., "Some Experiments on the Recognition of Speech, with One and with Two Ears", In Journal of the acoustical society of America, vol. 25, Issue 5, Sep. 1953, pp. 975-979.

Chung, et al., "VoxCeleb2: Deep Speaker Recognition", In Journal of Computing Research Repository, Jun. 14, 2018, 6 Pages.

Duan, et al., "Online PLCA for Real-Time Semi-supervised Source Separation", In Proceedings of the 10th International conference on Latent Variable Analysis and Signal Separation, Mar. 12, 2012, 8 Pages.

Ephrat, et al., "Looking to Listen at the Cocktail Party: A Speaker-Independent Audio-Visual Model for Speech Separation", In the Journal of ACM Transactions on Graphics, vol. 37 Issue 4, Aug. 2018, 11 Pages.

Frew, Befkadu Belete., "Audio-Visual Speech Recognition using LIP Movement for Amharic Language", In International Journal of Engineering Research & Technology, vol. 8, Issue 8, Aug. 2019, pp. 594-604.

Gabbay, et al., "Visual Speech Enhancement", In Repository of arXiv:1711.08789v3, Jun. 13, 2018, 5 Pages.

Ghazanfar, et al., "Neuroperception: Facial Expressions Linked to Monkey Calls", In Journal of Nature, vol. 423, Jun. 26, 2003, pp. 937-938.

He, et al., "Deep Residual Learning for Image Recognition", In Proceedings of the IEEE Conference on Computer Vision and Pattern Recognition, Jun. 27, 2016, pp. 770-778.

Hou, et al., "Audio-Visual Speech Enhancement Using Multimodal Deep Convolutional Neural Networks", In Journal of IEEE Transactions on Emerging Topics in Computational Intelligence, vol. 2, Issue 2, Apr. 2018, pp. 117-128.

Hu, et al., "A Tandem Algorithm for Pitch Estimation and Voiced Speech Segregation", In Journal of IEEE Transactions on Audio, Speech, and Language Processing, vol. 18, Issue 8, Nov. 2010, pp. 2067-2079.

Hu, et al., "Squeeze-and-Excitation Networks", In Proceedings of IEEE Conference on Computer Vision and Pattern Recognition, Jun. 18, 2018, pp. 7132-7141.

Ibrahim, et al., "Feature-Fusion Based Audio-Visual Speech Recognition Using Lip Geometry Features in Noisy Environment", In ARPN Journal of Engineering and Applied Sciences, vol. 10, Issue 23, Dec. 2015, pp. 17521-17527.

Karpathy, et al., "Large-Scale Video Classification with Convolutional Neural Networks", In Proceedings of IEEE Conference on Computer Vision and Pattern Recognition, Jun. 23, 2014, pp. 1725-1732.

Katsaggelos, et al., "Audiovisual Fusion: Challenges and New Approaches", In Proceedings of the IEEE, vol. 103, Issue 9, Sep. 2015, pp. 1635-1653.

Michelsanti, et al., "On Training Targets and Objective Functions for Deep-learning-based Audio-visual Speech Enhancement", In Proceedings of IEEE International Conference on Acoustics, Speech and Signal Processing, May 12, 2019, pp. 8077-8081.

Miyato, et al., "cGANs with Projection Discriminator", In Journal of Computing Research Repository, Feb. 15, 2018, 21 Pages.

Moradi, et al., "Gated Audiovisual Speech Identification in Silence vs. Noise: Effects on Time and Accuracy", In Journal of Frontiers in Psychology, vol. 4, Jun. 19, 2013, 13 Pages.

Partan, et al., "Communication Goes Multimodal", In Journal of Science, vol. 283, Issue 5406, Feb. 26, 1999, pp. 1272-1273.

Piczak, Karol J., "ESC: Dataset for Environmental Sound Classification", In Proceedings of the 23rd Annual ACM Conference on Multimedia, Oct. 26, 2015, 4 Pages.

Rowe, Candy, "Sound Improves Visual Discrimination Learning in Avian Predators", In Proceedings of the Royal Society of London. Series B: Biological Sciences, vol. 269, Issue 1498, Jun. 11, 2002, pp. 1353-1357.

Shi, et al., "Real-Time Single Image and Video Super-Resolution Using an Efficient Sub-Pixel Convolutional Neural Network", In Proceedings of the IEEE Conference on Computer Vision and Pattern Recognition, Jun. 27, 2016, pp. 1874-1883.

Stafylakis, et al., "Combining Residual Networks with LSTMs for Lipreading", In Journal of Computing Research Repository, Mar. 12, 2017, 5 Pages.

Stenzel, et al., "Limits of Perceived Audio-Visual Spatial Coherence as Defined by Reaction Time Measurements", In Journal of Frontiers in neuroscience, vol. 13, May 22, 2019, 17 Pages.

Taal, et al., "An Algorithm for Intelligibility Prediction of Time-Frequency Weighted Noisy Speech", In Journal of IEEE Transactions on Audio, Speech, and Language Processing, vol. 19, Issue 7, Sep. 2011, pp. 2125-2136.

Takeuchi, et al., "Decision Fusion by Boosting Method for Multi-Modal Voice Activity Detection", In International Conference on Audio-Visual Speech Processing, Sep. 30, 2010, 4 Pages.

Torfi, et al., "3D Convolutional Neural Networks for Cross Audio-Visual Matching Recognition", In Journal of IEEE Access, vol. 5, Oct. 9, 2017, 11 Pages.

Xia, et al., "Sound Event Detection in Multichannel Audio Using Convolutional Time-Frequency-Channel Squeeze and Excitation", In Journal of Computing Research Repository, Aug. 4, 2019, 5 Pages.

(56) References Cited

OTHER PUBLICATIONS

Zhang, et al., "Position-Squeeze and Excitation Module for Facial Attribute Analysis", In Journal of British Machine Vision Conference, Sep. 3, 2018, 11 Pages.

Zhang, et al., "S3FD: Single Shot Scale-invariant Face Detector", In Proceedings of the IEEE International Conference on Computer Vision, Oct. 22, 2017, pp. 192-201.

Iuzzolino, et al., "AV(SE)2: Audio-Visual Squeeze-Excite Speech Enhancement", In Proceedings of IEEE International Conference on Acoustics, Speech and Signal Processing (ICASSP), May 4, 2020, pp. 7539-7543.

Joze, et al., "MMTM: Multimodal Transfer Module for CNN Fusion", In repository of arXiv, arXiv:1911.08670v1, Nov. 20, 2019, pp. 1-11.

"International Search Report and Written Opinion Issued in PCT Application No. PCT/US20/056233", dated Feb. 26, 2021, 13 Pages.

* cited by examiner

AUDIO-VISUAL SPEECH ENHANCEMENT

CROSS-REFERENCE TO RELATED APPLICATION

This application claims priority to U.S. Provisional Patent Application Ser. No. 62/931,499, filed Nov. 6, 2019, the entirety of which is hereby incorporated herein by reference for all purposes.

BACKGROUND

Speech enhancement aims to increase the perceptual quality and intelligibility of an input signal. For example, when an input signal comprises a target speaker, interference (e.g., non-target speakers), and noise (such as babble, reverberation, stationary and non-stationary sounds, etc.), speech enhancement may be used to attempt to recover the target speaker signal from the mix.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

One disclosed example provides a computing system, comprising one or more processors, and memory comprising instructions executable by the one or more processors to implement a speech enhancement system. The speech enhancement system comprises a spatio-temporal residual network configured to receive video data from a video containing a target speaker and extract visual features from the video data, an autoencoder comprising an encoder, a decoder, and skip connections between the encoder and the decoder. The autoencoder is configured to receive input of an audio spectrogram, the audio spectrogram obtained based upon an audio waveform extracted from the video containing the target speaker, and to extract audio features from the audio spectrogram. The speech enhancement system further comprises a squeeze-excitation fusion block configured to receive input of visual features from a layer of the spatio-temporal residual network and input of audio features from a layer of the autoencoder, and to provide an output to the decoder. The decoder is configured to output a mask configured based upon the fusion of audio features and visual features by the squeeze-excitation fusion block. The instructions are further executable to apply the mask to the audio spectrogram to generate an enhanced magnitude spectrogram, and to reconstruct an enhanced waveform from the enhanced magnitude spectrogram.

Another disclosed example provides a computer-implemented method of audiovisual fusion. The method comprises extracting video frames from a video containing a target speaker, and for each video frame, detecting a mouth of the target speaker in the video frame and cropping the video frame around the mouth. The method further comprises inputting the video frames, after cropping, into a spatio-temporal residual network configured to extract visual features from each video frame, extracting an audio waveform from the video containing the target speaker, and applying a transform to the audio waveform to obtain an audio spectrogram. The method further comprises inputting the audio spectrogram into an autoencoder comprising an encoder, a decoder, and skip connections between the encoder and decoder, and extracting, via the autoencoder, audio features in the audio spectrogram. The method further comprises inputting visual features from a layer of the spatio-temporal residual network and audio features from a layer of the autoencoder into a squeeze-excitation fusion block, providing an output from the squeeze-excitation fusion block to the decoder, outputting, via the decoder, a mask, generating an enhanced magnitude spectrogram by applying the mask to the audio spectrogram, and generating an enhanced waveform from the enhanced magnitude spectrogram.

DETAILED DESCRIPTION

Figure 1:
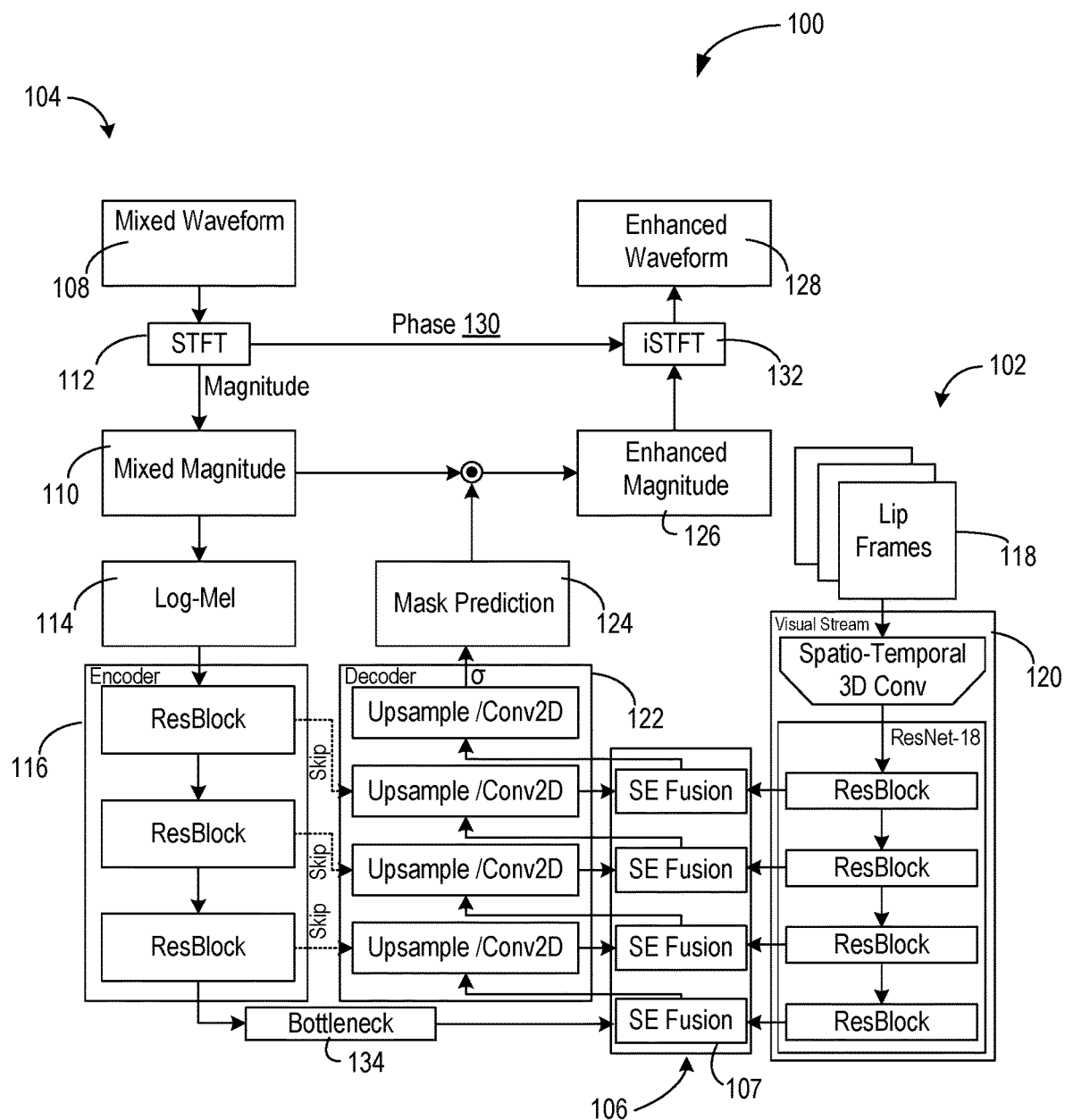
FIG. 1 shows an example system architecture for a computer-implemented audiovisual squeeze excite speech enhancement system.

Computerized speech enhancement may have many practical applications, such as in automatic speech recognition systems, telecommunication and teleconferencing systems, and hearing aids, as examples. Work in this domain may be at least in part motivated by the cocktail party effect, which refers to the ability of humans to selectively attend to auditory signals of interest within a noisy environment. Experiments in neuroscience have demonstrated that cross-modal integration of audio-visual signals may improve the perceptual quality of a targeted acoustic signal. Additionally, psycho-linguistic studies have investigated the effects of visual information on auditory encoding. Such studies have shown that visual cues may speed up linguistic recognition under noisy listening conditions, and that spatial decoherence between audio and visual sources may affect percept encoding.

Some approaches to computerized AV speech enhancement models utilize deep neural networks. Other approaches utilizes late fusion, where the audio and visual information is processed separately and then integrated at a singular point via channel-wise concatenation. These approaches have achieved some degree of a computational cocktail party effect. However, late fusion does not allow for feature-level correlation across modalities.

In computer vision, work has been done on video classification using deep neural networks that compared late fusion, slow fusion, and early fusion of time-based, uni-modal visual signals. This work demonstrated that slow fusion may be most effective. Further, while channel-wise concatenation of cross-modal signals is currently used for conditional generative models, concatenation of cross-modal information may not effectively model the underlying correlations between features.

Squeeze-excitation (SE) networks may offer an alternative to channel-wise concatenation via a lightweight, adaptive gating mechanism that has been demonstrated to work well on sound event detection. Accordingly, examples are disclosed that relate to approaches to audiovisual (AV) fusion within a deep learning framework that utilize a squeeze-excitation (SE) fusion block that integrates AV information across multiple levels of audio and visual feature representations within both late and slow fusion schemes. In the disclosed examples, visual features are generated according to Stafylakis and Tzimiropoulos (Themos Stafylakis and Georgios Tzimiropoulos, "Combining Residual Networks with LSTMS for Lipreading," *arXiv preprint arXiv:*1703.04105, 2017). Following Gabbay et al. (Aviv Gabbay, Asaph Shamir, and Shmuel Peleg, "Visual Speech Enhancement," *arXiv preprint arXiv:*1711.08789, 2017) and Michelsanti et al. (Daniel Michelsanti, Zheng-Hua Tan, Sigurdur Sigurdsson, and Jesper Jensen, "On Training Targets and Objective Functions for Deep-Learning-Based Audio-Visual Speech Enhancement," *ICASSP 2019-2019 IEEE International Conference on Acoustics, Speech and Signal Processing (ICASSP)*. IEEE, 2019, pp. 8077-8081), an autoencoder neural network with skip connections is used as the audio network. In other examples, other suitable networks may be used for the audio and visual data processing.

The disclosed examples differ from the findings of Michelsanti et al. on optimal target domains. In the disclosed examples, the objective is trained using the indirect mapping approach of Afouras et al. (Triantafyllos Afouras, Joon Son Chung, and Andrew Zisserman, "The conversation: Deep Audio-Visual Speech Enhancement," *arXiv preprint arXiv:* 1804.04121, 2018) and Ephrat et al. (Ariel Ephrat, Inbar Mosseri, Oran Lang, Tali Dekel, KevinWilson, Avinatan Hassidim, William T Freeman, and Michael Rubinstein, "Looking to Listen at the Cocktail Party: A Speaker-Independent Audio-Visual Model for Speech Separation," *arXiv preprint arXiv:*1804.03619, 2018) with log-mel transformed inputs. The disclosed method, referred to herein as AV(SE)$^2$, when compared against the late fusion methods for AV speech enhancement, demonstrates that the SE fusion block yields improvements in performance and up to a 37% reduction in the number of model parameters.

FIG. 1 schematically shows an architecture of an example AV(SE)$^2$ system 100. System 100 comprises a video stream 102, an audio stream 104, and an SE fusion block 106 comprising (in this example) a plurality of SE fusion layers 107. System 100 converts an audio waveform 108 to a mixed magnitude spectrogram 110 via short-time Fourier transform (STFT) 112. The mixed magnitude spectrogram 110 is log-mel transformed 114, and input to an autoencoder (indicated as encoder 116, bottleneck 134, and decoder 122). Video 118 is ingested by the visual network 120 and integrated with audio via SE fusion 106. While decoder 1-1 fusion is depicted in FIG. 1, the decoder 122 may use other audio-visual feature relationships in other examples. The output comprises a mask 124 that is applied element-wise to the mixed magnitude spectrogram 110, resulting in an enhanced magnitude spectrogram 126. The enhanced magnitude spectrogram 126 is applied to mixed spectrogram phase information 130 via inverse short-time Fourier transform (iSTFT) 132 to produce an enhanced waveform 128. In other examples, other suitable transforms than the STFT and iSTFT may be used.

Visual information is sampled as non-overlapping frames from video containing a target speaker at 25 frames per second (FPS), or other suitable frame rate. The visual processing includes using S$^3$FD (described by Shifeng Zhang, Xiangyu Zhu, Zhen Lei, Hailin Shi, Xiaobo Wang, and Stan Z Li, "S3fd: Single Shot Scale-Invariant Face Detector," *Proceedings of the IEEE International Conference on Computer Vision,* 2017, pp. 192-201) to detect the speaker's face in each frame. In other examples, other suitable methods may be used to detect a speaker's face. Similar to Zhang et al., visual processing may include discarding redundant visual information and cropping the mouth region. Any suitable methods may be used to perform these processes. In one example, a Facial Alignment Network (e.g. as described in Adrian Bulat and Georgios Tzimiropoulos, "How Far Are We from Solving the 2d & 3d Face Alignment Problem? (and a Dataset of 230,000 3d Facial Landmarks)," *International Conference on Computer Vision,* 2017) ingests the face detection and produces facial landmarks usable to crop the region around the speaker's mouth. In this example, the resulting lip frame is resized to 122×122, transformed to grayscale, and normalized using global mean and variance statistics from a training set to produce video data to provide to the visual network 120.

The visual network 120 extracts visual features, $F_v$, using a spatio-temporal residual network, such as that proposed by Stafylakis and Tzimiropoulos. The visual network 120 comprises a 3D spatio-temporal convolution followed by a 2D ResNet-18 (such as that proposed by Kaiming He, Xiangyu Zhang, Shaoqing Ren, and Jian Sun, "Deep Residual Learning for Image Recognition," *Proceedings of the IEEE Conference on Computer Vision and Pattern Recognition,* 2016, pp. 770-778), and a bi-directional long short-term memory (LSTM) network. In some examples, the visual network 120 input accepts T×112×112 lip frames, where T=29 in this example. These parameters may be varied in other examples. Features are extracted from the ResNet. Let $F_v^i$ denote visual feature at layer ResNet layer i. $F_v^i \in \mathbb{R}^{b \cdot t \times h \times w \times c}$, where h, w are spatial dimensions and b, t, c are the batch, temporal, and channel dimensions, respectively. To apply 2D convolutions to 3D features, in this example the temporal dimension, t, is packed into the first dimension alongside batch. Consequently, t is unpacked from the first dimension via reshaping such that $\mathbb{R}^{b \times t \times h \times w \times c}$ during feature extraction for AV fusion. The visual network is randomly initialized and trained on the speech-enhancement task. Example methods for integrating $F_v$ with audio features are described in more detail below.

For audio processing, the audio waveform extracted from the video containing a target speaker may be processed following the methods of Afouras et al. and Gabbay et al. Per these methods, the spectrogram is obtained using STFT with a Hanning window function. As mentioned above, video frames may be sampled at 25 FPS. In some such examples, a window length of 40 ms, hop size of 10 ms, and sampling rate of 16 kHz for STFT may be used, to align one video frame to four steps of audio spectrogram. The resulting spectrogram, $X_{spec} \in \mathbb{R}^{T \times F}$, has a frequency resolution of F=321 that represents frequencies from 0 to 8 kHz in this example. In other examples, other suitable parameters may be used.

As mentioned above, the audio network comprises an autoencoder 116 with skip connections. The encoder 116 may use four residual blocks (two 2D convolution operations per block) and take the log $X_{mel} \in \mathbb{R}^{116 \times 80}$ representation, described above, as input. Convolution may be performed over time-frequency dimensions and may be followed by batch normalization and a leaky rectified linear unit (lReLU) activation with a slope, α, of 0.02 in this example. In other examples, other suitable parameters may be used.

The decoder 122 may comprise, for example, eight upsampling blocks, each comprising subpixel upsampling (e.g., as described in Wenzhe Shi, Jose Caballero, Ferenc Husz'ar, Johannes Totz, Andrew P Aitken, Rob Bishop, Daniel Rueckert, and Zehan Wang, "Real-time single image and video super-resolution using an efficient sub-pixel convolutional neural network," *Proceedings of the IEEE conference on computer vision and pattern recognition*, 2016, pp. 1874-1883), a 2D convolution along time-frequency dimensions, batch normalization, and lReLU($\alpha$=0.02), except for the final layer, which is sigmoid activated in this example. In other examples, other suitable decoder architectures may be used. The output of the example autoencoder network is a magnitude mask 124, M, and the enhanced magnitude spectrogram, $X_{enh}$, may be obtained via indirect mapping: $X_{enh}=M\odot X_{mag}$. Skip connections are employed between the encoder 116 and decoder 122 layers via channel-wise concatenation. Experiments using various direct mapping and mask approximation methods (described in Michelsanti et al., supra) indicate that indirect mapping may be more effective in the disclosed examples. Dropout is not used. Table 1, below, details example architecture parameters for the audio network.

TABLE 1

Detailed parameters for an example audio network. Res is a Basic Residual Block, SPU is subpixel upsampling (e.g., as described in Shi et al.), and Conv is a 2D convolution operation over time-frequency dimensions. Fractional stride indicates upsampling factor; e.g., stride of ½ indicates × 2 upsampling.

| Op | Filters | Kernel | Stride | Padding | t-F Dim |
|---|---|---|---|---|---|
| Encoder | | | | | |
| Input | — | — | — | — | 116 × 80 |
| Res1 | 128 | (3, 3) | (2, 2) | SAME | 58 × 40 |
| Res2 | 128 | (3, 3) | (2, 2) | SAME | 29 × 20 |
| Res3 | 256 | (3, 3) | (2, 2) | SAME | 15 × 10 |
| Res4 | 512 | (3, 3) | (2, 2) | SAME | 8 × 5 |
| Decoder | | | | | |
| SPU | — | — | (½, ½) | — | 16 × 10 |
| Conv | 32 | (3, 3) | (1, 1) | SAME | 16 × 10 |
| Skip | 32 + 256 | — | — | — | 16 × 10 |
| SPU | — | — | (½, ½) | — | 32 × 20 |
| Conv | 32 | (3, 3) | (1, 1) | SAME | 32 × 20 |
| Skip | 32 + 128 | — | — | — | 32 × 20 |
| SPU | — | — | (½, ½) | — | 64 × 40 |
| Conv | 16 | (3, 3) | (1, 1) | SAME | 64 × 40 |
| Skip | 16 + 128 | — | — | — | 64 × 40 |
| SPU | — | — | (½, ½) | — | 128 × 80 |
| Conv | 16 | (3, 3) | (1, 1) | SAME | 128 × 322 |
| SPU | — | — | (¼, 1) | — | 128 × 332 |
| Conv | 16 | (3, 3) | (1, 1) | (0, 1) | 128 × 322 |
| Conv | 8 | (5, 2) | (1, 1) | VALID | 124 × 321 |
| Conv | 4 | (5, 1) | (1, 1) | VALID | 120 × 321 |
| Conv | 1 | (5, 1) | (1, 1) | VALID | 116 × 321 |

Audio features, $F_a$, for use in the SE fusion block 106 are extracted from the encoder 116, bottleneck 134, or decoder 122. $F_a^j$ denotes the audio feature at layer j of the autoencoder. $F_a^j \in \mathbb{R}^{b \times t \times f \times c}$, where b, t, f, and c are the batch, temporal, $\mathbb{R}$ frequency, and channel dimensions, respectively.

Figure 2:
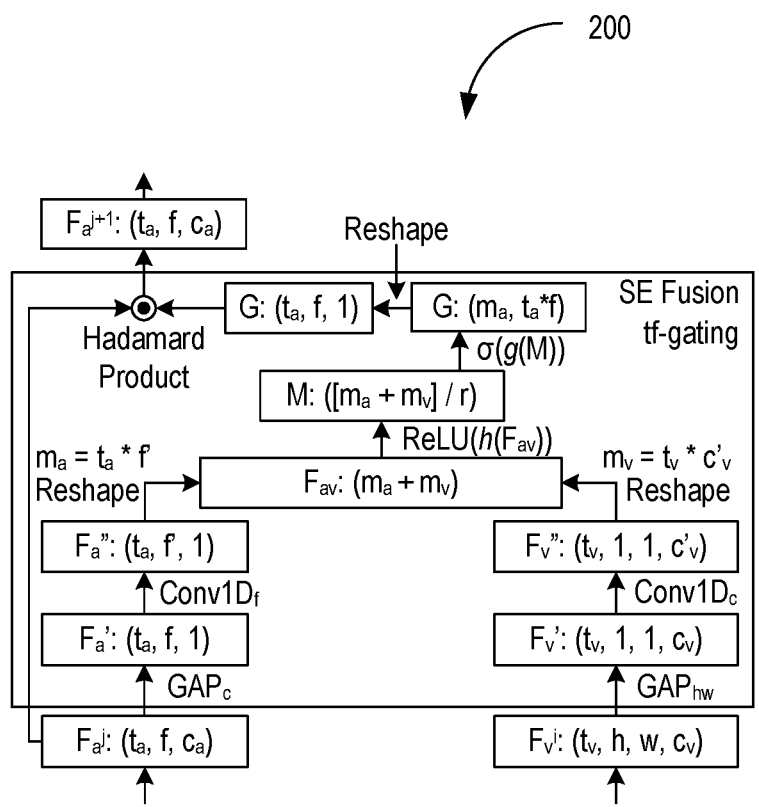
FIG. 2 shows an example tf-gating version of an audio-visual (AV) fusion block for the example speech enhancement system of FIG. 1.

The SE fusion block 106 is a gating block that models relationships between dimensions—temporal, channel, frequency—of audio and visual features. This may provide a light-weight mechanism for adaptive cross-modal integration of audio and visual features that may enhance the representational power of the network. FIG. 2 depicts an example architecture 200 usable for each SE fusion layer 107 in FIG. 1. In the example of FIG. 2, the SE fusion block architecture 200 is a tf-gating (temporal and frequency gating) version of an AV fusion block. Dimensionality is represented in (·). Subscripts denote dimension of operation: $GAP_c$ is global average pooling (GAP) over channel-dimension c, $GAP_{hw}$ is GAP over spatial dimensions wh, $Conv1D_f$ is a one-dimensional convolution across the frequency dimension f, and $Con1D_c$ is a one dimensional convolution across the channel dimension c.

The SE fusion block architecture 200 takes an audio feature $F_a^j$ from some layer j of the autoencoder and a visual feature $F_v^i$ from some layer i of the ResNet as input. The following descriptions drop i,j to simplify notation without loss of generality. The SE fusion block architecture 200 applies GAP to both input features to obtain compressed feature representations, $F_a'$ and $F_v'$. $F_a$ is compressed over the channel dimension, c, and $F_v$ over spatial dimensions, wh, resulting in $F_a' \in \mathbb{R}^{t_a \times f}$ and $F_v' \in \mathbb{R}^{t_v \times c_v}$. The SE fusion block architecture 200 applies 1D convolutions across the f and $c_v$ dimensions of $F_a'$ and $F_v'$, respectively, by a dimension reduction factor k. In this example, k=4. This results in $F_a'' \in \mathbb{R}^{t_a \times f}$ and $F_v'' \in \mathbb{R}^{t_v \times c_v'}$. $F_a''$ and $F_v''$ are reshaped such that $F_a'' \in \mathbb{R}^{m_a}$ and $F_v'' \in \mathbb{R}^{m_v}$, where $m_a = t_a \cdot f$ and $m_v = t_v \cdot c_v'$, then concatenated into a fused feature vector, $F_{av} \in \mathbb{R}^{m_a + m_v}$. A linear transformation, h, is applied such that M=ReLU(h($F_{av}$)), with $M \in \mathbb{R}^{(m_a + m_v)/r}$, where r is a squeeze factor. In this example, the selected squeeze factor is r=8. The SE fusion block architecture 200 applies a second linear transform, g, such that $G = \sigma(g(M)) \in \mathbb{R}^z$, where $\sigma$ is sigmoid activation and z varies with gating dimension. For example, with t-gating, $z=t_a$, and with tf-gating, $z=t_a \cdot f$. Finally, G is broadcast to the dimension of $F_a$ and the SE fusion block architecture 200 applies an audio feature gating as $F_a^{j+1} = G \odot F_a^j$.

The disclosed network may be trained to optimize (e.g. minimize) the reconstruction loss between the enhanced magnitude, $X_{eng}=M \odot X_{mix}$, and the target magnitude, $X_{spec}$, via $L_1$ loss. An optimization objective may be given by $\mathcal{L} = \|M \odot X_{mix} - X_{spec}\|_1$.

Experiments

Datasets: The disclosed example AV(SE)$^2$ model described above was trained on the VoxCeleb2 dataset (described by Joon Son Chung, Arsha Nagrani, and Andrew Zisserman, "Voxceleb2: Deep speaker recognition," *arXiv preprint arXiv:*1806.05622, 2018), which contains over 1 million utterances for 6,112 celebrities. The dataset is split by celebrity ID (CID) such that the train, validation, and test sets are disjoint over CID. The following datasets are used as noise: CHiME-1/3 (described by Jon Barker, Emmanuel Vincent, Ning Ma, Heidi Christensen, and Phil Green, "The PASCAL CHiME speech separation and recognition challenge," *Computer Speech and Language*, vol. 27, no. 3, pp. 621-633, May 2013; also described by Emmanuel Vincent Jon Barker, Ricard Marxer and Shinji Watanabe, "The Third 'Chime' Speech Separation and Recognition Challenge: Analysis and Outcomes," *Computer Speech and Language*, vol. 46, pp. 605-626, 2017), NonStationaryNoise (described by Zhiyao Duan, Gautham J Mysore, and Paris Smaragdis, "Online PLCA for Real-Time Semi-Supervised Source Separation," in *International Conference on Latent Variable Analysis and Signal Separation*. Springer, 2012, pp. 34-41), ESC50 (described by Karol J. Piczak, "ESC: Dataset for Environmental Sound Classification," *Proceedings of the 23rd Annual ACM Conference on Multimedia*. 2015, pp. 1015-1018, ACM Press), HuCorpus (described by Guoning Hu and DeLiang Wang, "A Tandem Algorithm for Pitch Estimation and Voiced Speech Segregation," *IEEE Transactions on Audio, Speech, and Language Processing*, vol. 18, no. 8, pp. 2067-2079, 2010), and private noise datasets.

Experimental conditions: The effectiveness of the SE fusion block 106 was shown by comparing to an AV baseline model having the architecture described above with respect to the audio network. The baseline uses late fusion with channel-wise concatenation of AV features. Experiments were conducted over three factors of variation to compare the disclosed method of late and slow fusion using SE fusion blocks 106.

First, SE fusion can occur at the bottleneck 134 (BN-only), encoder 116 (E-only), or decoder 122 (D-only). BN-only fusion is similar to the architecture of the AV baseline wherein AV features are fused via late integration with channel-wise concatenation, except that late fusion is applied via the SE block 106. Conversely, E-only and D-fuse visual features at each audio feature layer of the encoder 116 or decoder 122, respectively.

Second, for E-only and D-only approaches, SE fusion is applied such that there exists a 1-to-1 mapping between each layer i in the visual network and each layer j in the encoder/decoder of the audio network. Alternatively, the last feature of the visual network, $F_v^4$, may be mapped to all layers j in the audio network. This is referred to as $F_v^4$-to-all. For BN-only, $F_v^4$ was mapped to the audio network's bottleneck 134.

Third, within the SE fusion block 106 gating is applied over different audio feature dimensions: time (t-gating), channel (c-gating), frequency (f-gating), and combinations thereof.

Training: Training samples were generated as follows. The full set of lip frames and audio spectrograms pairs, (Xvid,Xspec), were order-shuffled and iterated over each epoch. A noise spectrogram, $X_n$, was randomly sampled from the training noise sets, and an additional non-stationary noise spectrogram, $X_{n2}$, was sampled with probability p=0.1. The mixture signal, $X_{mix}$, is obtained as $X_{mix}=X_{spec}+\alpha X_n+\beta X_{n2}$, where $\alpha$, $\beta$ are mixing coefficients computed to achieve a specific signal-to-noise ratio (SNR) value; SNR values were randomly sampled from the range of 0 to 20 decibels (dB). The magnitude and phase were separated from the spectrogram, and the magnitudes were transformed to a log-mel representation, $\log X_{mel} \in \mathbb{R}^{T \times F}$, where F=80. Input audio representations were not normalized. The visual frames, $X_{vid}$, were augmented via random cropping (±5 pixels) and left-right flips. Augmented frames were resized to 112×112 and fed into the visual network. The model was trained to optimize the objective given by $\mathcal{L}=\|M \odot X_{mix}-X_{spec}\|_1$ using a batch size of 4. The Adam optimizer was employed with an initial learning rate of 0.01 and validation loss was monitored to avoid overfitting. Models were trained for ~140 epochs.

Results: Objective evaluation results are shown below in Table 2. Enhanced speech was evaluated using the perceptual quality of speech quality (PESQ) (described by ITU-T Recommendation, "Perceptual evaluation of speech quality (pesq): An objective method for end-to-end speech quality assessment of narrow-band telephone networks and speech codecs," *Rec. ITU-T P. 862*, 2001), which is an objective measure of subjective listening tests. Enhanced speech was also evaluated using the short-time objective intelligibility (STOI)(described by Cees H Taal, Richard C Hendriks, Richard Heusdens, and Jesper Jensen, "An algorithm for intelligibility prediction of time-frequency weighted noisy speech," *IEEE Transactions on Audio, Speech, and Language Processing*, vol. 19, no. 7, pp. 2125-2136, 2011), which is correlated with the intelligibility of noisy speech. Version 2 of the AV(SE)² system (indicated as AV(SE)²-v2 in Table 2) was found to achieve the best PESQ and STOI measures of those evaluated and outperformed the AV baseline by 0.06 PESQ and the AO baseline by 0.119 PESQ. The AV baseline has ~54 million (M) parameters, whereas AV(SE)²-v2 has ~34M, a 36% reduction in parameters. The other AV(SE)² versions that outperformed the AV baseline afford a 29-37% parameter reduction. Overall, fusion at the bottleneck and encoder showed relatively better performance, and 1-to-1 fusion outperformed $F_v^4$-to-all when fusion occurred at the encoder or decoder. Time-based gating at the bottleneck offered relatively better performance over channel-wise gating. However, no global trend was observed for gating. The disclosed model may generalize to speakers unseen during training since CID is disjoint across train and test sets. Similarly, AV(SE)² generalizes across noise types.

TABLE 2

Objective evaluation of speech enhancement, where CWC is channel-wise concatenation, underline indicates performance greater than AV baseline, and bold indicates best performance of the models evaluated.

| Set | Fusion Layer | SE Mode | Gating Dim | PESQ | STOI |
|---|---|---|---|---|---|
| Target | — | — | — | 4.644 | 1.000 |
| Mixed | — | — | — | 2.188 | 0.900 |
| AO BL | — | — | — | 2.788 | 0.930 |
| AV Baseline | BN | CWC | — | 2.917 | 0.933 |
| AV(SE)²-v1 | BN | $F_v^4$-to-all | c | <u>2.920</u> | <u>0.933</u> |
| AV(SE)²-v2 | BN | $F_v^4$-to-all | t | 2.982 | 0.935 |
| AV(SE)²-v3 | BN | $F_v^4$-to-all | tf | 2.907 | <u>0.934</u> |
| AV(SE)²-v4 | BN | $F_v^4$-to-all | tc | <u>2.922</u> | 0.933 |
| AV(SE)²-v5 | BN | $F_v^4$-to-all | tfc | <u>2.923</u> | <u>0.934</u> |
| AV(SE)²-v6 | E | $F_v^4$-to-all | t | 2.891 | 0.932 |
| AV(SE)²-v7 | E | $F_v^4$-to-all | tf | 2.888 | 0.930 |
| AV(SE)²-v8 | E | $F_v^4$-to-all | tc | 2.862 | <u>0.934</u> |
| AV(SE)²-v9 | E | 1-to-1 | t | 2.893 | <u>0.933</u> |
| AV(SE)²-v10 | E | 1-to-1 | tf | <u>2.938</u> | <u>0.934</u> |
| AV(SE)²-v11 | E | 1-to-1 | tc | 2.889 | 0.933 |
| AV(SE)²-v12 | D | $F_v^4$-to-all | t | 2.782 | 0.923 |
| AV(SE)²-v13 | D | $F_v^4$-to-all | tf | 2.837 | 0.930 |
| AV(SE)²-v14 | D | $F_v^4$-to-all | tc | 2.802 | 0.928 |
| AV(SE)²-v15 | D | 1-to-1 | t | 2.846 | 0.927 |
| AV(SE)²-v16 | D | 1-to-1 | tf | 2.868 | 0.930 |
| AV(SE)²-v17 | D | 1-to-1 | tc | 2.888 | 0.931 |

Various alterations to the disclosed model and training procedure may be used. For example, introducing a progressively increasing number of interference speakers during training, coupled with curriculum learning across SNR values (e.g., as is done in Afouras et al.), may lead to performance gains. Further, pretraining a visual network on a word-level lip reading task may also lead to improvements in system performance. Lastly, improvements in PESQ and STOI measures (greater than 0.5 in PESQ and greater than 0.25 in STOI) were observed when using the target phase to reconstruct the enhanced signal. During inference, the target phase is unavailable; however, experimental observations indicate potential boosts to performance afforded by modeling phase.

Figure 3A:
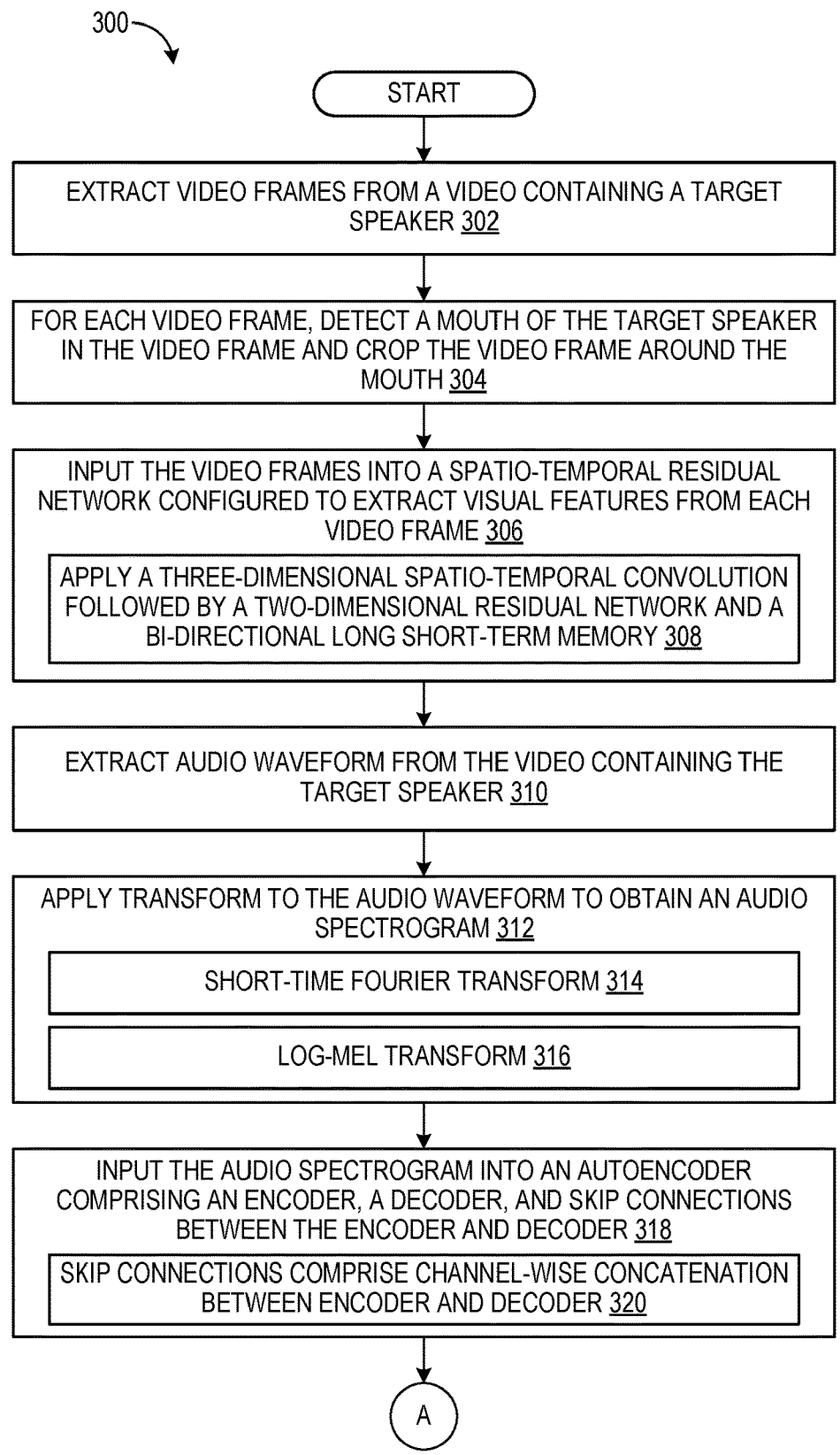
FIGS. 3A-3C show a flow diagram depicting an example method for performing speech enhancement.
Figure 3B:
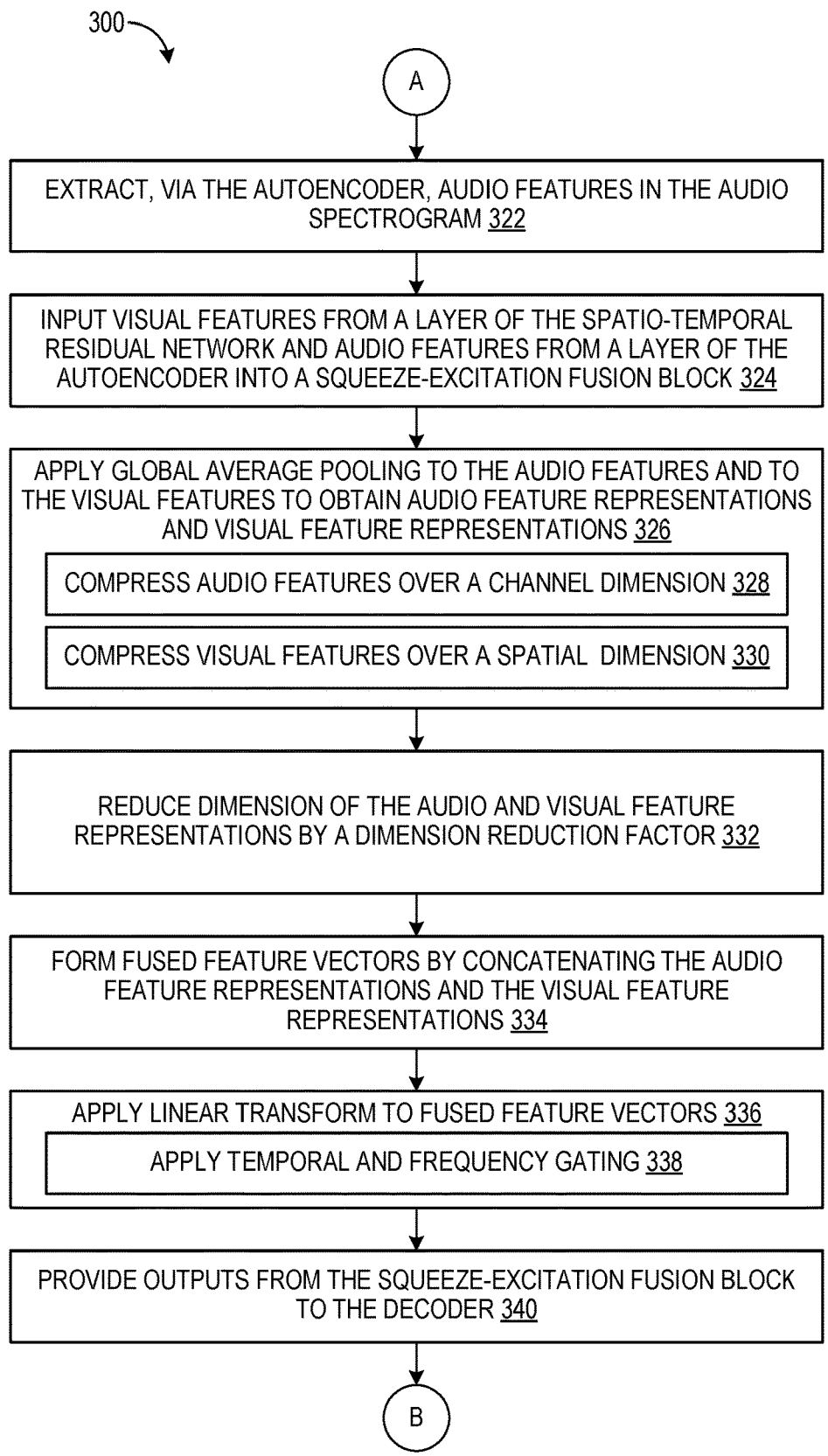
Figure 3C:
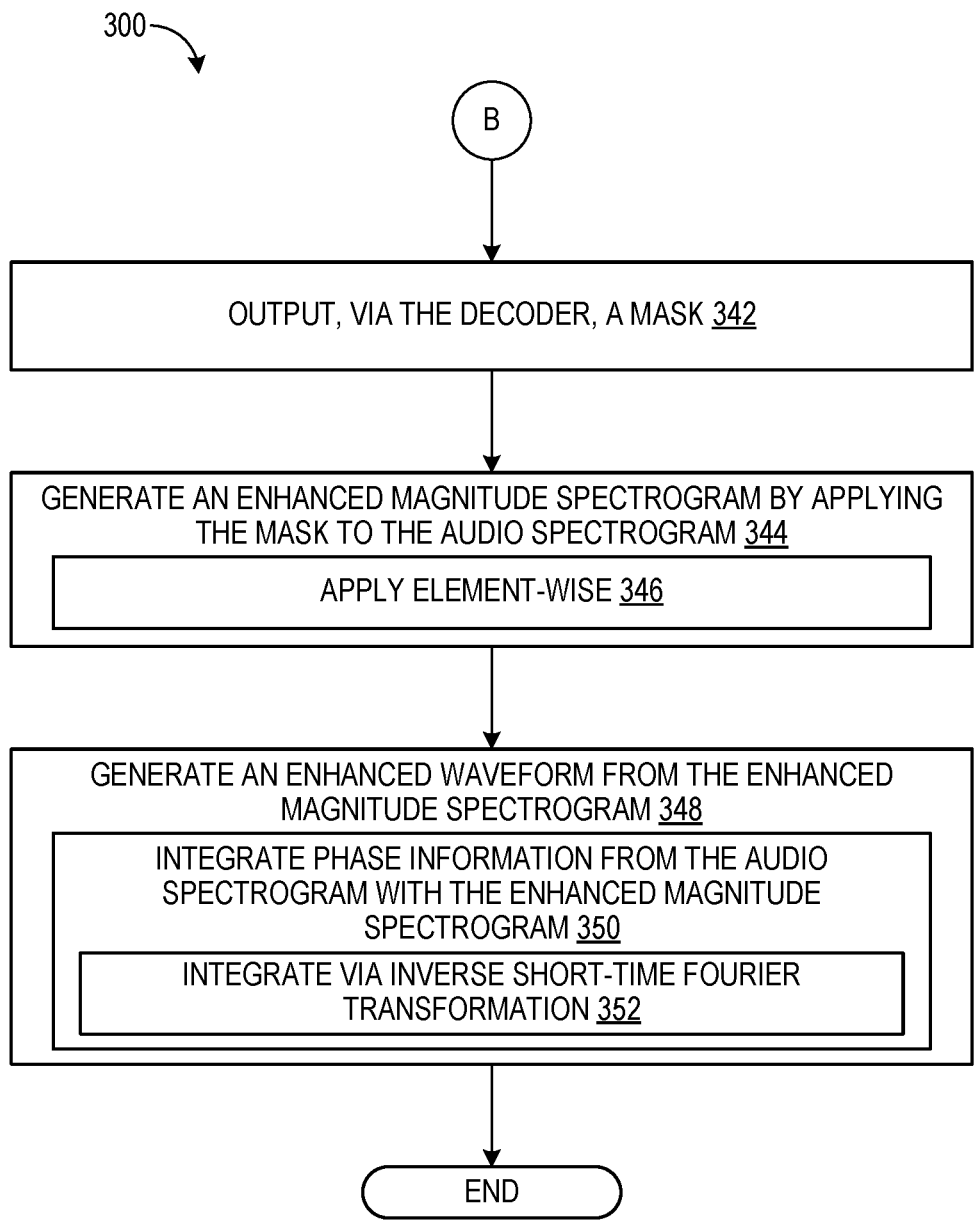

FIGS. 3A-3C shows a flow diagram that illustrates an example computer-implemented method 300 for performing speech enhancement. Method 300 may be performed on any suitable computing system. Method 300 comprises, at 302, extracting video frames from a video containing a target speaker. Method 300 further comprises, at 304, for each video frame, detecting a mouth of the target speaker in the video frame and cropping the video frame around the mouth. Any suitable methods may be used to detect the mouth of the target speaker, including but not limited to the S³fd method described above. After cropping, method 300 comprises, at 306, inputting the video frames into a spatio-temporal residual network configured to extract visual features from each video frame. In some examples, extracting the visual features may comprise applying a three-dimensional spatio-temporal convolution followed by a two-dimensional residual network and a bi-directional long short-term memory network, as indicated at 308.

Method 300 further comprises, at 310, extracting an audio waveform from the video containing the target speaker, and at 312, applying a transform to the audio waveform to obtain an audio spectrogram. In some examples, applying the transform may comprise applying one or more of a short-time Fourier transform or other time/frequency transform as indicated at 314. Further, applying the transform may comprise applying a log-mel transform, as indicated at 316.

Method 300 further comprises, at 318, inputting the audio spectrogram into an autoencoder comprising an encoder, a decoder, and skip connections between the encoder and decoder. The skip connections may comprise channel-wise concatenation between encoder and decoder, as indicated at 320. Continuing, method 300 comprises, at 322, extracting via the autoencoder audio feature in the audio spectrogram.

At 324, method 300 comprises inputting the visual features from a layer of the spatio-temporal residual network and audio features from a layer of the autoencoder into a squeeze-excitation fusion block. In some examples, squeeze-excitation fusion may be used between multiple layers of the autoencoder and spatio-temporal residual network. The squeeze-excitation fusion block may be configured to perform various processes. For example, the squeeze-excitation fusion block may be configured to apply global average pooling to the audio feature and to the visual feature to obtain audio feature representation and visual feature representation, as indicated at 326. The global average pooling may be performed on any suitable dimensions. In some examples, as indicated at 328, the global average pooling compresses a channel dimension of audio features. Further, in some examples, as indicated at 330, the global average pooling compresses a spatial dimension of visual features. As another example process, the squeeze-excitation fusion block may reduce dimensions of the audio feature representation and/or the visual feature representation by a dimension reduction factor, as shown at 332. As a more specific example, the audio frequency dimension and visual channel dimensions may be reduced by the dimension reduction factor.

The squeeze-excitation fusion block forms fused feature vectors by concatenating the audio feature representations and the visual feature representations, as shown at 334. After forming the fused feature vector, the fused feature vector is upsampled, for example, by applying one or more linear transform to the fused feature vector, as indicated at 336. For example, as described above, a linear transformation, h, may be applied such that M=ReLU(h($F_{av}$)), with M∈$\mathbb{R}^{(m_a+m_v)/r}$, where r is a $\mathbb{R}$ squeeze factor. Further, a second linear transform, g, may be applied such that G=σ(g(M))∈$\mathbb{R}^z$, where σ is sigmoid activation and z varies with gating dimension. For example, with t-gating, z=$t_a$, and with tf-gating, z=$t_a$·f, as indicated at 338.

Continuing, method 300 comprises, at 340, providing outputs from the squeeze-excitation fusion block to the decoder, and at 342, outputting a mask via the decoder. Method 300 next comprises, at 344, generating an enhanced magnitude spectrogram by applying the mask to the audio spectrogram. The application of the mask to the spectrogram may be element-wise (multiplicative), as shown at 346. In other examples, and equivalently, an additive operation may be used when converting both the magnitude and mask in the log domain. Further, at 348, method 300 comprises generating an enhanced waveform from the enhanced magnitude spectrogram. This may comprise, at 350, integrating phase information from the audio spectrogram with the enhanced magnitude spectrogram. In some examples, this may be performed via an inverse short-time Fourier transformation, as indicated at 352.

Accordingly, the disclosed examples provide an approach to audio-visual fusion via squeeze-excitation blocks. The disclosed SE fusion block integrates visual information through slow fusion across multiple feature layers of the audio network by learning a time-based adaptive gating on audio features. Objective measures demonstrate that the disclosed method may outperform the baseline AV fusion model while maintaining an improvement over audio-only models. Moreover, the improvements in objective measures may be accompanied by a reduction in the number of model parameters.

In some embodiments, the methods and processes described herein may be tied to a computing system of one or more computing devices. In particular, such methods and processes may be implemented as a computer-application program or service, an application-programming interface (API), a library, and/or other computer-program product.

Figure 4:
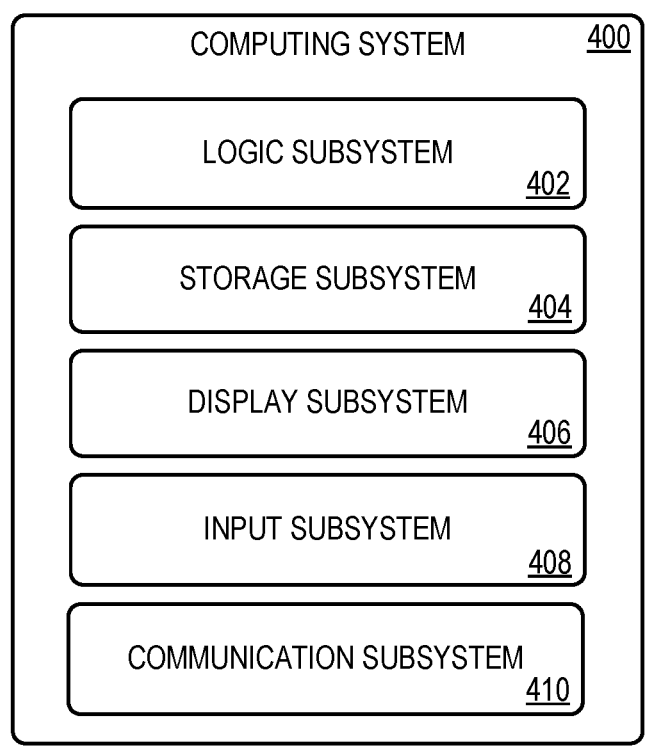
FIG. 4 shows a block diagram illustrating an example computing system.

FIG. 4 schematically shows a non-limiting embodiment of a computing system 400 that can enact one or more of the methods and processes described above. Computing system 400 is shown in simplified form. Computing system 400 may take the form of one or more personal computers, server computers, tablet computers, home-entertainment computers, network computing devices, gaming devices, mobile computing devices, mobile communication devices (e.g., smart phone), and/or other computing devices.

Computing system 400 includes a logic machine 402 and a storage machine 404. Computing system 400 may optionally include a display subsystem 406, input subsystem 408, communication subsystem 410, and/or other components not shown in FIG. 4.

Logic machine 402 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 402 may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 404 includes one or more physical devices configured to hold instructions executable by the logic machine to implement the methods and processes described herein. When such methods and processes are implemented, the state of storage machine 404 may be transformed—e.g., to hold different data.

Storage machine 404 may include removable and/or built-in devices. Storage machine 404 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 404 may include volatile, nonvolatile, dynamic, static, read/write, read-only, random-access, sequential-access, location-addressable, file-addressable, and/or content-addressable devices.

It will be appreciated that storage machine 404 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 402 and storage machine 404 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 400 implemented to perform a particular function. In some cases, a program may be instantiated via logic machine 402 executing instructions held by storage machine 404. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 406 may be used to present a visual representation of data held by storage machine 404. This visual representation may take the form of a graphical user interface (GUI). As the herein described methods and processes change the data held by the storage machine, and thus transform the state of the storage machine, the state of display subsystem 406 may likewise be transformed to visually represent changes in the underlying data. Display subsystem 406 may include one or more display devices utilizing virtually any type of technology. Such display devices may be combined with logic machine 402 and/or storage machine 404 in a shared enclosure, or such display devices may be peripheral display devices.

When included, input subsystem 408 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 410 may be configured to communicatively couple computing system 400 with one or more other computing devices. Communication subsystem 410 may include wired and/or wireless communication devices compatible with one or more different communication protocols. As non-limiting examples, the communication subsystem 410 may be configured for communication via a wireless telephone network, or a wired or wireless local- or wide-area network. In some embodiments, the communication subsystem may allow computing system 400 to send and/or receive messages to and/or from other devices via a network such as the Internet.

Another example provides a computing system, comprising one or more processors, and memory comprising instructions executable by the one or more processors to implement a speech enhancement system. The speech enhancement system comprises a spatio-temporal residual network configured to receive video data from a video containing a target speaker and extract visual features from the video data, an autoencoder comprising an encoder, a decoder, and skip connections between the encoder and the decoder, the autoencoder configured to receive input of an audio spectrogram, the audio spectrogram obtained based upon an audio waveform extracted from the video containing the target speaker, the autoencoder being configured to extract audio features from the audio spectrogram, and a squeeze-excitation fusion block configured to receive input of visual features from a layer of the spatio-temporal residual network and input of audio features from a layer of the autoencoder, and to provide an output to the decoder of the autoencoder, wherein the decoder is configured to output a mask based upon the fusion of audio features and visual features by the squeeze-excitation fusion block, and wherein the instructions are executable to apply the mask to the audio spectrogram to generate an enhanced magnitude spectrogram, and to reconstruct an enhanced waveform from the enhanced magnitude spectrogram. In some such examples the spatio-temporal residual network comprises a three-dimensional spatio-temporal convolution followed by a two-dimensional residual network and a bi-directional long short-term memory. In some such examples the instructions executable to receive video data are executable to receive a cropped video frame comprising a mouth of the target speaker in the video data. In some such examples the instructions are further executable to detect the mouth of the target speaker in a video frame and to crop the video frame around the mouth to produce the cropped video frame. In some such examples the instructions are executable to obtain the audio spectrogram by applying a short-time Fourier transform to the audio waveform. In some such examples, the skip connections comprise channel-wise concatenation. In some such examples, the enhanced waveform are executable to integrate phase information from the audio spectrogram with the enhanced magnitude spectrogram via inverse short-time Fourier transformation. In some such examples the squeeze-excitation fusion block comprises temporal and frequency gating. In some such examples the instructions are executable for the squeeze-excitation fusion block to apply global average pooling to the audio features and to the visual features to compress the audio features over a channel dimension to obtain audio feature representations, and to compress the visual features over a spatial dimension to obtain visual feature representations. In some such examples the instructions are executable to reduce a frequency dimension of the audio feature representations and to reduce a channel dimension of the visual feature representations by a dimension reduction factor. In some such examples the instructions are executable to form a fused feature vector by concatenating the audio feature representations and the visual feature representations. In some such examples reconstructing the enhanced waveform comprises integrating the enhanced magnitude spectrogram with phase information from the audio spectrogram via inverse short-time Fourier transform.

Another example provides a computer-implemented method of audiovisual fusion. The computer-implemented method comprises extracting video frames from a video containing a target speaker, for each video frame, detecting a mouth of the target speaker in the video frame and cropping the video frame around the mouth, inputting the video frames after cropping into a spatio-temporal residual network configured to extract visual features from each video frame, extracting an audio waveform from the video containing the target speaker, applying a transform to the audio waveform to obtain an audio spectrogram, inputting the audio spectrogram into an autoencoder comprising an encoder, a decoder, and skip connections between the encoder and decoder, extracting, via the autoencoder, audio features in the audio spectrogram, inputting visual features from a layer of the spatio-temporal residual network and audio features from a layer of the autoencoder into a squeeze-excitation fusion block, providing an output from the squeeze-excitation fusion block to the decoder, outputting, via the decoder, a mask, generating an enhanced magnitude spectrogram by applying the mask to the audio spectrogram, and generating an enhanced waveform from the enhanced magnitude spectrogram. In some such examples inputting the video frames into the spatio-temporal residual network comprises applying a three-dimensional spatio-temporal convolution followed by a two-dimensional residual network and a bi-directional long short-term memory. In some such examples generating the enhanced waveform comprises integrating phase information from the audio spectrogram with the enhanced magnitude spectrogram via inverse short-time Fourier transformation. In some such examples applying the mask to the audio spectrogram comprises applying the mask element-wise to the audio spectrogram. In some such examples the method further comprises applying a log-mel transform to the audio spectrogram prior to inputting the audio spectrogram into the autoencoder.

Another example provides a computing system, comprising one or more processors, and memory comprising instructions executable by the one or more processors to extract video frames from a video containing a target speaker, for each video frame, detect a mouth of the target speaker in the video frame and cropping the video frame around the mouth, input the video frames after cropping into a spatio-temporal residual network configured to extract visual features from each video frame, extract an audio waveform from the video containing the target speaker, apply a transform to the audio waveform to obtain an audio spectrogram, input the audio spectrogram into an autoencoder comprising an encoder, a decoder, and skip connections between the encoder and decoder, extract, via the autoencoder, audio features in the audio spectrogram, input visual features from a layer of the spatio-temporal residual network and audio features from a layer of the autoencoder into a squeeze-excitation fusion block, provide an output from the squeeze-excitation fusion block to the decoder, outputting, via the decoder, a mask, generate an enhanced magnitude spectrogram by applying the mask to the audio spectrogram, and generate an enhanced waveform from the enhanced magnitude spectrogram. In some such examples the instructions are executable for the squeeze-excitation fusion block to apply global average pooling to the audio features and to the visual features to compress the audio features over a channel dimension to obtain audio feature representations, and to compress the visual features over a spatial dimension to obtain visual feature representations. In some such examples the instructions are executable to reduce a frequency dimension of the audio feature representations and to reduce a channel dimension of the visual feature representations by a dimension reduction factor, and to form a fused feature vector by concatenating the audio feature representations and the visual feature representations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
one or more processors; and
memory comprising instructions executable by the one or more processors to implement a speech enhancement system comprising
a spatio-temporal residual network configured to receive video data from a video containing a target speaker and extract visual features from the video data;
an autoencoder comprising an encoder, a decoder, and skip connections between the encoder and the decoder, the autoencoder configured to receive input of an audio spectrogram, the audio spectrogram obtained based upon an audio waveform extracted from the video containing the target speaker, the autoencoder being configured to extract audio features from the audio spectrogram; and
a squeeze-excitation fusion block configured to receive input of visual features from a layer of the spatio-temporal residual network and input of audio features from a layer of the autoencoder, to process the audio features to obtain audio feature representations, to process the visual features to obtain visual feature representations, and to provide an output to the decoder of the autoencoder, wherein each of processing the audio features and processing the visual features comprises applying one or more of global average pooling or convolution;
wherein the decoder is configured to output a mask based upon the fusion of audio features and visual features by the squeeze-excitation fusion block, and wherein the instructions are executable to apply the mask to the audio spectrogram to generate an enhanced magnitude spectrogram, and to reconstruct an enhanced waveform from the enhanced magnitude spectrogram.

2. The computing system of claim 1, wherein the spatio-temporal residual network comprises a three-dimensional spatio-temporal convolution followed by a two-dimensional residual network and a bi-directional long short-term memory.

3. The computing system of claim 1, wherein the instructions executable to receive video data are executable to receive a cropped video frame comprising a mouth of the target speaker in the video data.

4. The computing system of claim 3, wherein the instructions are further executable to detect the mouth of the target speaker in a video frame and to crop the video frame around the mouth to produce the cropped video frame.

5. The computing system of claim 1, wherein the instructions are executable to obtain the audio spectrogram by applying a short-time Fourier transform to the audio waveform.

6. The computing system of claim 1, wherein the skip connections comprise channel-wise concatenation.

7. The computing system of claim 1, wherein the instructions executable to reconstruct the enhanced waveform are executable to integrate phase information from the audio spectrogram with the enhanced magnitude spectrogram via inverse short-time Fourier transformation.

8. The computing system of claim 1, wherein the squeeze-excitation fusion block comprises temporal and frequency gating.

9. The computing system of claim 1, wherein the instructions executable for the squeeze-excitation fusion block to process the audio features and to process the visual features comprise instructions to compress the audio features over a channel dimension to obtain the audio feature representations, and to compress the visual features over a spatial dimension to obtain the visual feature representations.

10. The computing system of claim 9, wherein the instructions are executable to reduce a frequency dimension of the audio feature representations and to reduce a channel dimension of the visual feature representations by a dimension reduction factor.

11. The computing system of claim 10, wherein the instructions are executable to form a fused feature vector by concatenating the audio feature representations and the visual feature representations.

12. The computing system of claim 10, wherein reconstructing the enhanced waveform comprises integrating the enhanced magnitude spectrogram with phase information from the audio spectrogram via inverse short-time Fourier transform.

13. A computer-implemented method of audiovisual fusion, the computer-implemented method comprising:
extracting video frames from a video containing a target speaker;
for each video frame, detecting a mouth of the target speaker in the video frame and cropping the video frame around the mouth;
inputting the video frames after cropping into a spatio-temporal residual network configured to extract visual features from each video frame;
extracting an audio waveform from the video containing the target speaker;
applying a transform to the audio waveform to obtain an audio spectrogram;
inputting the audio spectrogram into an autoencoder comprising an encoder, a decoder, and skip connections between the encoder and decoder;
extracting, via the autoencoder, audio features in the audio spectrogram;
inputting visual features from a layer of the spatio-temporal residual network and audio features from a layer of the autoencoder into a squeeze-excitation fusion block;
processing, via the squeeze-excitation fusion block, the audio features to obtain audio feature representations, wherein processing the audio features comprises applying one or more of global average pooling or convolution;
processing, via the squeeze-excitation fusion block, the visual features to obtain visual feature representations, wherein processing the visual features comprises applying one or more of global average pooling or convolution;
providing an output from the squeeze-excitation fusion block to the decoder;
outputting, via the decoder, a mask;
generating an enhanced magnitude spectrogram by applying the mask to the audio spectrogram; and
generating an enhanced waveform from the enhanced magnitude spectrogram.

14. The computer-implemented method of claim 13, wherein inputting the video frames into the spatio-temporal residual network comprises applying a three-dimensional spatio-temporal convolution followed by a two-dimensional residual network and a bi-directional long short-term memory.

15. The computer-implemented method of claim 13, wherein generating the enhanced waveform comprises integrating phase information from the audio spectrogram with the enhanced magnitude spectrogram via inverse short-time Fourier transformation.

16. The computer-implemented method of claim 13, wherein applying the mask to the audio spectrogram comprises applying the mask element-wise to the audio spectrogram.

17. The computer-implemented method of claim 13, further comprising applying a log-mel transform to the audio spectrogram prior to inputting the audio spectrogram into the autoencoder.

18. A computing system, comprising:
one or more processors; and
memory comprising instructions executable by the one or more processors to:
extract video frames from a video containing a target speaker;
for each video frame, detect a mouth of the target speaker in the video frame and cropping the video frame around the mouth;
input the video frames after cropping into a spatio-temporal residual network configured to extract visual features from each video frame;
extract an audio waveform from the video containing the target speaker;
apply a transform to the audio waveform to obtain an audio spectrogram;
input the audio spectrogram into an autoencoder comprising an encoder, a decoder, and skip connections between the encoder and decoder;
extract, via the autoencoder, audio features in the audio spectrogram;
input visual features from a layer of the spatio-temporal residual network and audio features from a layer of the autoencoder into a squeeze-excitation fusion block;

process, via the squeeze-excitation fusion block, the audio features to obtain audio feature representations, wherein processing the audio features comprises applying one or more of global average pooling or convolution;

process, via the squeeze-excitation fusion block, the visual features to obtain visual feature representations, wherein processing the visual features comprises applying one or more of global average pooling or convolution;

provide an output from the squeeze-excitation fusion block to the decoder;

outputting, via the decoder, a mask;

generate an enhanced magnitude spectrogram by applying to the audio spectrogram; and generate an enhanced waveform from the enhanced magnitude spectrogram.

19. The computing system of claim 18, wherein the instructions executable for the squeeze-excitation fusion block to process the audio features and to process the visual features comprise instructions executable to compress the audio features over a channel dimension to obtain the audio feature representations, and to compress the visual features over a spatial dimension to obtain the visual feature representations.

20. The computing system of claim 19, wherein the instructions are executable to reduce a frequency dimension of the audio feature representations and to reduce a channel dimension of the visual feature representations by a dimension reduction factor, and to form a fused feature vector by concatenating the audio feature representations and the visual feature representations.

* * * * *